United States Patent
Kjær et al.

(10) Patent No.: US 11,867,586 B2
(45) Date of Patent: Jan. 9, 2024

(54) METHOD AND WEARING PARTS FOR PREDICTIVE MAINTENANCE

(71) Applicant: PTFE Engineering A/S, Hillerød (DK)

(72) Inventors: Arne Kjær, Hillerød (DK); Matias Titoff, Kemi (FI)

(73) Assignee: PTFE Engineering A/S, Hillerød (DK)

( * ) Notice: Subject to any disclaimer, the term of this patent is extended or adjusted under 35 U.S.C. 154(b) by 345 days.

(21) Appl. No.: 17/425,792

(22) PCT Filed: Jan. 28, 2020

(86) PCT No.: PCT/EP2020/051973
§ 371 (c)(1),
(2) Date: Jul. 26, 2021

(87) PCT Pub. No.: WO2020/157028
PCT Pub. Date: Aug. 6, 2020

(65) Prior Publication Data
US 2022/0057294 A1    Feb. 24, 2022

(30) Foreign Application Priority Data

Jan. 28, 2019 (EP) .................................. 19153896
Apr. 8, 2019 (EP) .................................. 19167834

(51) Int. Cl.
*G01M 11/08* (2006.01)
*G01N 21/01* (2006.01)

(52) U.S. Cl.
CPC .......... *G01M 11/086* (2013.01); *G01N 21/01* (2013.01); *G01N 2021/0112* (2013.01)

(58) Field of Classification Search
CPC ................. G01M 11/086; G01N 21/01; G01N 2021/0112
See application file for complete search history.

(56) References Cited

U.S. PATENT DOCUMENTS

| | | | | |
|---|---|---|---|---|
| 5,581,019 A | * | 12/1996 | Minor | G01M 13/005 73/114.77 |
| 6,710,328 B1 | * | 3/2004 | Mastro | G01L 1/24 250/227.14 |
| 8,149,394 B2 | * | 4/2012 | Burchardt | G01M 5/0016 356/237.1 |
| 8,571,813 B2 | * | 10/2013 | Johnston | G01M 5/0091 702/34 |
| 9,297,708 B1 | * | 3/2016 | Morris | G01M 11/086 |
| 11,056,024 B2 | * | 7/2021 | Schade | G02B 6/124 |

* cited by examiner

*Primary Examiner* — Daniel Petkovsek
(74) *Attorney, Agent, or Firm* — Chambliss, Bahner & Stophel, P.C.; Stephen D. Adams (57) ABSTRACT

The present invention relates to a method for, and wearing parts to be used in a method for, condition based preventive maintenance (PM) or predictive maintenance (Pd M) based on detecting excessive wear of a wearing part which wearing part either consists primarily of, or is covered at least partially by a sliding layer consisting primarily of, a polymer material and which wearing part comprises one or more optical fibers which in the proximal end is connected to a proximal light detecting device and in the distal to a distal end light detecting device.

22 Claims, 6 Drawing Sheets

METHOD AND WEARING PARTS FOR PREDICTIVE MAINTENANCE

BACKGROUND

Maintenance operations include functional checks, servicing, repairing or replacing of devices, equipment, machinery, building infrastructure, and supporting utilities in industrial, business, governmental, and residential installations, which is aimed at minimizing the downtime, whether in production or processes, in order for the productivity and the profitability of a given plant, facility or installation to be kept as high as possible.

Many, if not all, areas of technology, like industrial plants, facility management industries, marine transportation, offshore structures etc. are highly dependent on efficient maintenance, repair and overhaul procedures including scheduled maintenance programs to maintain and/or restore the intended functionality of devices, equipment, machinery, building infrastructure, and supporting utilities in industrial, business, governmental, and residential installations.

Maintenance operations, however, are subject to considerable uncertainty. There is uncertainty both with respect to timing, i.e. when maintenance/replacement will in fact be needed, just like there is uncertainty with respect to the actual scope of a given maintenance operation, i.e. which parts will in fact need maintenance/replacement.

Both methods for, and wearing parts to be used in methods for, maintenance are known from the prior art.

The aspect of detecting damage etc. to the structure of a wearing part by an optical-fiber is well-known from e.g.: US2011/0231110A1, US2009/0262331A1, U.S. Pat. Nos. 5,656,996A, 5,525,796A, 4,636,638, 5,142,141, WOø7090436 A1, U.S. Pat. No. 7,316,154 and DE 102 61 823 A1.

Thus, e.g. US2011/0231110A1 describes an optic sensor system for detecting surface wear, comprising one or more optical fibers, each having a second end upon which phosphor has been disposed in a substrate at a given depth below a wear surface. The system allegedly relies on monitoring a second photonic energy emitted by the phosphor into (or perhaps rather back into) the fiber in response to a first photonic energy injected into the optical fibers. Thus, when wear results in the removal of the phosphor from one or more of the described fibers, a detector detects a proportional reduction of the second photonic energy emitted by the phosphor, indicating that wear has reached the given depth.

Similarly US2009/0262331A1 describes a crack detection system and a method for detecting cracks in a loaded engineering structure, which includes a light source coupled to optical fibres that are led through the structure. The optical fibres are described to have diameters below 75 μm. The light source is coupled to the optical fibres and it is described that when in use the light pulses from the light source will in a situation where there is no cracks pass the fibre and leave it at the tip end of the fibre so that the light detectors do not detect any light, but that in case of a crack a cut in the fibre could occur which would lead to reflections so that light is reflected back from the crack to the light detector. Thus, the systems and methods described in US2009/0262331A1 relates to loaded engineering structures rather than wearing parts.

In contrast to the methods and wearing parts of the present invention, the solutions described in US2011/0231110A1, US2009/026331A1, U.S. Pat. Nos. 5,656,996A, 5,525, 796A, 4,636,638, 5,142,141, WOø7090436 A1, U.S. Pat. No. 7,316,154 and DE 102 61 823 A1 do not make it possible to monitor a) when a pre-selected wear level has been reached anywhere along the circumference of dynamic sealings or gaskets wearing parts, or b) when a pre-selected wear level has been reached anywhere from one end to the other of a given wearing part.

U.S. Pat. No. 5,581,019 describes methods for, and wearing parts to be used in methods for, maintenance, based on the use of an electrical monitoring system, making use of gaskets or sealings made from a fluorine-based synthetic resin e.g. polytetrafluoroethylene (PTFE) and comprising a sensor element part that provide a damage/leak detection function based on the measurement of conductivity. It is mentioned that these gaskets/sealings may optionally comprise an optical-fiber, i.e. in addition to the conductivity-based sensor, which is to be used in the determination of time-domain reflectometry (TDR) data. TDR depends on relatively complicated and expensive equipment, which is able to detect and analyse Rayleigh backscatter from the fiber.

Also, e.g KR20160020851A describes a sealing made of a fluorine-based synthetic resin (such as ethylene tetrafluoroethylene (ETFE) or polytetrafluoroethylene (PTFE) comprising a sensor element that provides a leak detecting function. KR20160020851A, however, does not mention the use of optical fibers as part of the sensor element.

Regardless, there is a continued need for improvements to processes and tools for use in maintenance operations, aimed at optimizing the ability to be able to foresee or monitor when maintenance/replacement is needed and if so which specific parts of a given piece of equipment that are in need of maintenance/replacement. The present invention meets these needs by providing both a method for, and wearing parts to be used in a method for, maintenance. In contrast to the methods and wearing parts described in the prior art the present invention relies on the combination of a wearing part, e.g. a sealing or gasket, made from a polymer, e.g. ETFE or PTFE, with a relatively simple and inexpensive optical fiber-based damage-detector functionality, which is based on the emission and detection of visible light at both the proximal and distal end of said optical fiber or fibers, when light is emitted from a light emitting device into said optical fiber or fibres. Thus, in methods and wearing parts according to the present invention the emission and detection of visible light at both the proximal and distal end of said optical fiber or fibers will only occur if said optical fiber or fibres still allow for (i.e. if the fiber or fibres have not yet been compromised by excessive wear of the wearing part) the emitted light to travel either a) substantially the entire circumference of a given wearing part, or b) substantially the entire length of a given wearing part, through said optical fiber or fibres. In this way, the present invention makes it possible to monitor when a pre-selected wear level has been reached e.g. anywhere along the circumference of a dynamic sealing or gasket. In particular the present invention makes it possible to monitor when a pre-selected wear level has been reached anywhere along the circumference of dynamic sealings or gaskets of a relatively large size, e.g. in case of dynamic sealings or gaskets for use in the Pulp and Paper industry typically having diameters from ø900 to ø6000 mm, and/or in case of dynamic sealings or gaskets for use in the oil and gas and off shore industry typically having diameters ranging from ø300 mm to ø4000 mm. Similarly for linear applications the present invention makes it possible to monitor when a pre-selected wear level has been reached anywhere from one end to the other of a given wearing part having ranges of up 30 km. If desired the dynamic sealing or gasket in question can be equipped with several optic fibres (i.e. rather than just a single fibre), which will allow for the collection of more detailed data/information about wear level. The data/information about wear level obtained by the use of methods and wearing parts according to the present invention can be used to optimize maintenance tasks in an way, which was not possible based on the use of the methods and wearing parts of the prior art. The methods and wearing parts of the present invention are particularly useful for wearing parts of machinery or structures where it is either complicated or impossible to routinely investigate the actual level of wear of the wearing parts. This would be applicable to e.g. large machinery where wearing parts are de facto hidden inside the machine in question, such as inside pulp and paper machinery, or large constructions where it is impossible or very difficult to inspect the wear surface in question, such as long bridges or windmills. Diameters of the wearing parts in such machinery or constructions may typically be from ø800 mm to ø10000 mm.

SUMMARY OF THE INVENTION

Even if maintenance operations can by their very nature be both scheduled and non-scheduled, so-called preventive and/or predictive maintenance operations are often used as cost-effective practices to keep equipment ready for operation at all times and to minimize both the number of and the length of periods during which any given device, equipment, machinery, building infrastructure, and/or supporting utility is not available for its intended purposes.

The maintenance strategies that occur most often are preventive and corrective maintenance.

Under a corrective maintenance strategy, a part is not replaced until it has failed, while under a preventive maintenance strategy, the aim is to replace parts before failure occurs.

Preventive maintenance (PM), thus, is the care and servicing by personnel for the purpose of maintaining equipment in satisfactory operating condition by providing for systematic inspection, detection, and correction of incipient failures either before they occur or before they develop into major defects.

Preventive maintenance (PM) strategies can be further subdivided into usage and condition based preventive maintenance.

Under usage based PM, the total time a part has been used is measured and maintenance is conducted when a certain threshold level has been reached.

In condition based PM, also sometimes called predictive maintenance (PdM), the actual condition of a part is monitored and maintenance is planned and conducted based on the actual condition of the part in question at any given point in time. Thus condition based PM (or PdM) differs from usage based PM because it relies on the actual condition of equipment, rather than average or expected life statistics, to predict when maintenance will be required.

In the context of the above the present invention provides a method for, and wearing parts to be used in a method for, so-called condition based preventive maintenance (PM) or predictive maintenance (PdM) based on detecting excessive wear of a wearing part, which wearing part either consists primarily of, or is covered at least partially by a sliding layer consisting primarily of, a polymer material and which wearing part comprises one or more optical fibers, optionally interconnected by reflectors or splitters, which in the proximal end is connected to a proximal light detecting device and in the distal end to a distal end light detecting device.

In particular the present invention provides a method for so-called condition based preventive maintenance (PM) or predictive maintenance (PdM), which is based on detecting excessive wear of a wearing part, which wearing part:
a) either consists primarily of, or is covered at least partially by a sliding layer consisting primarily of, a polymer material such as PolyTetra Flour Ethylen (PTFE), Polychlorotrifluoroethylene (PCTFE), Perfluoroalkoxy (PFA), Tetrafluorethylene-perfluoropropylene (FEP), ETFE, FEP, LCP, Chlorotrifluoroethylene (E-CTFE), PE, PEEK, PET, PVDF, THV and/or the like, and
b) comprises one or more optical fibers fitted in, embedded in, indented in or fused with said polymer material, of which:
at least one first optical fiber is in its proximal end connected to a proximal light detecting device comprising a first element which emits visible light when light is emitted from a light emitting device into the proximal end of said at least one first optical fiber, and
at least one optical fiber, optionally being said first optical fiber, is in its distal end connected to a distal end light detecting device comprising a second element, which emits visible light, when light, emitted from said light emitting device into said proximal end of said at least one first optical fiber, is emitted from the distal end of said optical fiber, optionally being said first optical fiber,
and which wearing part and one or more optical fibers are further characterized in that
c) light emitted from said light emitting device into said proximal end of said at least one first optical fiber, has travelled either along substantially the entire circumference of said wearing part, or has traversed substantially the entire length of said wearing part, through said optical fiber or fibers, when emitted from the distal end of said optical fiber, optionally being said first optical fiber, and
d) the distance travelled by said light along said substantially entire circumference of said wearing part, or when traversing said substantially entire length of said wearing part, between said proximal end of said at least one first optical fiber, and said distal end of said optical fiber, optionally being said first optical fiber, is at least 500 mm,
and, which method comprises at least the following steps:
turning on said light emitting device,
inspecting whether said proximal and said distal light detecting devices emit visible light, and
concluding that said wearing parts are not subject to excessive wear if both said proximal and said distal light detecting devices emit visible light Even if the detecting devices of a method according to the present invention primarily relies on the emission of visible light, the light emitted from the light emitting device into the proximal end of an optical fiber of a method according to the present invention may be of any kind, i.e. visible, laser or infrared light.

Also, the present invention provides a wearing part for use in so-called condition based preventive maintenance (PM) or predictive maintenance (PdM), which wearing part:
a) either consists primarily of, or is covered at least partially by a sliding layer consisting primarily of, a polymer material such as PolyTetra Flour Ethylen (PTFE), Polychlorotrifluoroethylene (PCTFE), Perfluoroalkoxy (PFA), Tetrafluorethylene-perfluoropropylene (FEP), ETFE, FEP, LCP, Chlorotrifluoroethylene (E-CTFE), PE, PEEK, PET, PVDF, THV and/or the like, and b) comprises one or more optical fibers fitted in, embedded in, indented in, or fused with said polymer material, of which:

at least one first optical fiber is in its proximal end connected to a proximal light detecting device comprising a first element which emits visible light when light is emitted from a light emitting device into the proximal end of said at least one first optical fiber, and at least one optical fiber, optionally being said first optical fiber, is in its distal end connected to a distal end light detecting device comprising a second element, which emits visible light, when light, emitted from said light emitting device into said proximal end of said at least one first optical fiber, is emitted from the distal end of said optical fiber, optionally being said first optical fiber, and which wearing part and one or more optical fibers are further characterized in that c) light emitted from said light emitting device into said proximal end of said at least one first optical fiber, has travelled either along substantially the entire circumference of said wearing part, or has traversed substantially the entire length of said wearing part, through said optical fiber or fibers, when emitted from the distal end of said optical fiber, optionally being said first optical fiber, and d) the distance travelled by said light along said substantially entire circumference of said wearing part, or when traversing said substantially entire length of said wearing part, between said proximal end of said at least one first optical fiber, and said distal end of said optical fiber, optionally being said first optical fiber, is at least 500 mm.

BRIEF DESCRIPTION OF THE FIGURES

FIG. 10 shows how one or more fibres can be fitted into a dynamic sealing according to a preferred embodiment of a wearing part according to the present invention, by providing installation grooves in the dynamic sealing, which guides the individual fibres to an accurate position. The installation grooves in the dynamic sealing can be made by different techniques suitable for the particular polymer material, which said dynamic sealing primarily consists of.

DETAILED DESCRIPTION OF THE INVENTION

As set out above the present invention provides a method for, and wearing parts to be used in a method for, condition based preventive maintenance (PM) or predictive maintenance (PdM) based on detecting excessive wear of a wearing part which wearing part either consists primarily of, or is covered at least partially by a sliding layer consisting primarily of, a polymer material and which wearing part comprises one or more optical fibers, optionally interconnected by reflectors or splitters, which in the proximal end is connected to a proximal light detecting device and in the distal end to a distal end light detecting device.

Wearing parts according to the present invention can have any physical form that is visible or tangible and is relatively stable and has surfaces in 3 dimensions; e.g. x, y and z.

In preferred embodiments of the present invention a wearing part according to the invention will be solid and will have a relatively large plane face in one dimension, also referred to as the base of said wearing part, and its overall surface will be defined further by faces intersecting in lines.

Geometrical shapes of relevance to wearing parts according to the present invention would include, but are not limited to:

Prisms: wearing parts with two congruent and parallel faces, e.g. in the form of rectangular prisms, e.g. in the form of cubes or sheets, preferably in the form of sheets defining a circumference around a void center. Wearing parts of the present invention may, however, also be in the form of e.g. triangular octagonal or hexagonal prisms.

Pyramids: wearing parts with a polygon (e.g. triangular or square) base and triangle sides.

Cylinders: wearing parts with two parallel circular bases, both preferably defining a circumference around a center.

Cones: wearing parts with a circular base and a curved side that ends in one point.

Spheres: wearing parts where all points on the surface are at an equal distance from the center point.

Torus: wearing parts which surface is generated by revolving a circle in three-dimensional space about an axis coplanar with the circle.

In preferred embodiments according to the present invention objects would include, but are not limited to prisms or tori, preferably sheets, and preferably sheets defining a circumference around a void center.

In certain preferred embodiments, e.g. sheets, one dimension of a wearing part according to the invention, e.g. x, might be relatively minute as compared to the other two dimensions of the object, e.g. y and z. Also, in certain preferred embodiments, e.g. sheets, one of the dimensions of a wearing part according to the invention, e.g. y, might be relatively extensive as compared to the other two dimensions, e.g. x and z.

In the context of the present invention the circumference of a wearing part, e.g. having a circular shape, is the (linear) distance around it. That is, in case of a wearing part having a circular shape the circumference would be the length of the circle defined by the wearing part if it was opened up and straightened out to a line segment. In other words in the context of the present invention circumference is in case of wearing parts of a non-circular shape used as a synonym for perimeter.

In the context of the present invention the size of a wearing part, whether in whole or in part, is preferably for sheets defining a circumference (i.e. circumference or perimeter as the case may be) around a void center defined in terms of its largest diameter (also denoted ø) in mm, cm or m, and for other wearing parts in terms of their length in cm, m or km. If defined in terms of its diameter this will in the context of non-circular wearing parts be done with reference to the distance between two individual points being on the circumference (or perimeter as the case may be) of said wearing part while at the same time being as far from each other as possible.

In methods and wearing parts according to the present invention the emission and detection of visible light at both the proximal and distal end of said optical fiber or fibers will only occur if said optical fiber or fibres still allow for (i.e. if the fiber or fibres have not yet been compromised by excessive wear of the wearing part) the emitted light to travel either a) substantially the entire circumference of a given wearing part, or b) substantially the entire length of a given wearing part, through said optical fiber or fibres. In this way, the present invention makes it possible to monitor when a pre-selected wear level has been reached e.g. anywhere along the circumference width of a dynamic sealing or gasket. In particular the present invention makes it possible to monitor when a pre-selected wear level has been reached anywhere along the circumference of dynamic sealings or gaskets of a relatively large size, e.g. in case of dynamic sealings or gaskets for use in the Pulp and Paper industry typically having diameters from ø900 to ø6000 mm, such as ø950 to ø5500 mm, e.g. ø1000 to ø5000 mm, such as ø1050 to ø4500 mm, e.g. ø1100 to ø4000 mm, such as ø1150 to ø3500 mm, e.g. ø1200 to ø3000 mm, such as ø1250 to ø2500 mm, e.g. ø1300 to ø2000 mm, such as ø1400 to ø1500.

In case of dynamic sealings or gaskets for use in the oil and gas and off shore industry typically having diameters ranging from ø300 mm to ø4000 mm, such as ø350 to ø3500 mm, e.g. ø400 to ø3000 mm, such as ø450 to ø2500 mm, e.g. ø500 to ø2000 mm, such as ø550 to ø1500 mm, e.g. ø600 to ø1000 mm.

Similarly for linear applications the present invention makes it possible to monitor when a pre-selected wear level has been reached anywhere from one end to the other of a given wearing part having ranges of up 30 km, such as up to 20 km, e.g. up to 15 km, such as up to 10 km, e.g. up to 5 km, such as up to 4 km, e.g. up to 3 km, such as up to 2 km, e.g. up to 1 km.

If desired the dynamic sealing or gasket in question can be equipped with several optic fibres (i.e. rather than just a single fibre), which will allow for the collection of more detailed data/information about wear level. The data/information about wear level obtained by the use of methods and wearing parts according to the present invention can be used to optimize maintenance tasks in an way, which was not possible based on the use of the methods and wearing parts of the prior art. The methods and wearing parts of the present invention are particularly useful for wearing parts of machinery or structures where it is either complicated or impossible to routinely investigate the actual level of wear of the wearing parts. This would be applicable to e.g. large machinery where wearing parts are de facto hidden inside the machine in question, such as inside pulp and paper machinery, or large constructions where it is impossible or very difficult to inspect the wear surface in question, such as long bridges or windmills. Diameters of the wearing parts in such machinery or constructions may typically be from ø800 mm to ø10000 mm.

In a particular preferred embodiment of this invention, it is possible to follow the wear of a dynamic sealing in a way, which enables the gathering of information as to when it is worn to critical level and thus also enables prediction as to the expected additional lifetime of the dynamic seal. In this embodiment optical fibres are placed in such a way that loss of emitted light will indicate when there is sufficient time to plan a seal change, so that sudden seal failure followed by immediate production stop resulting in high economical losses and high maintenance costs can be avoided.

As used herein "Wear" is the damaging, gradual removal or deformation of material at solid surfaces. Causes of wear can be mechanical (e.g., erosion) or chemical (e.g., corrosion). The study of wear and related processes is referred to as tribology. Wear in machine elements, together with other processes such as fatigue and creep, causes functional surfaces to degrade, eventually leading to material failure or loss of functionality. Thus, wear has large economic relevance.

The wear rate is affected by factors such as type of loading (e.g., impact, static, dynamic), type of motion (e.g., sliding, rolling), and temperature. Depending on the tribosystem, different wear types and wear mechanisms can be observed.

Wear is commonly classified according to so-called wear types, which occur in isolation or complex interaction. Common types of wear include: Adhesive wear, Abrasive wear, Surface fatigue, Fretting wear, Erosive wear, Corrosion and oxidation wear. Other, less common types of wear are impact-, cavitation- and diffusive wear.

Each wear type is caused by one or more wear mechanisms. For example, the primary wear mechanism of adhesive wear is adhesion. Wear mechanisms and/or sub-mechanisms frequently overlap and occur in a synergistic manner, producing a greater rate of wear than the sum of the individual wear mechanisms.

Adhesive wear can be found between surfaces during frictional contact and generally refers to unwanted displacement and attachment of wear debris and material compounds from one surface to another.

Abrasive wear occurs when a hard rough surface slides across a softer surface. ASTM International defines it as the loss of material due to hard particles or hard protuberances that are forced against and move along a solid surface.

Thus, as already explained above maintenance operations can by their very nature be both scheduled and non-scheduled, so-called preventive and/or predictive maintenance operations are often used as cost-effective practices to keep equipment ready for operation at all times and to minimize both the number of and the length of periods during which any given device, equipment, machinery, building infrastructure, and/or supporting utility is not available for its intended purposes.

For the purpose of describing maintenance operations, a given piece of equipment can be described as a collection of interrelated parts. Maintenance operations can then be viewed as consisting largely (but not solely) in replacing any of these interrelated parts of a given piece of equipment. Different so-called maintenance strategies determine when parts of a given piece of equipment are to be replaced or maintained. The maintenance strategies that occur most often are preventive and corrective maintenance.

Under a corrective maintenance strategy, a part is not replaced until it has failed, while under a preventive maintenance strategy, the aim is to replace parts before failure occurs.

While corrective maintenance can be an attractive option for parts that are not normally subject to excessive wear, such as electronics, it can be beneficial to follow a preventive maintenance strategy in relation to parts that do normally wear.

In the context of the present invention preventive maintenance (PM) is understood to be the care and servicing by personnel for the purpose of maintaining equipment in satisfactory operating condition by providing for systematic inspection, detection, and correction of incipient failures either before they occur or before they develop into major defects. It includes work carried out on equipment in order to avoid its breakdown or malfunction, and is, thus, normally a regular and routine action, including e.g. tests, measurements, adjustments, parts replacement, and cleaning, performed specifically to prevent faults from occurring.

The main goal behind PM is for the equipment to make it from one planned service to the next planned service without any failures caused by fatigue, neglect, or normal wear (preventable items). This may be by preventing the failure before it actually occurs. It is designed to preserve and restore equipment reliability by replacing worn components before they actually fail. Maintenance activities include partial or complete overhauls at specified periods, oil changes, lubrication, minor adjustments, and so on. In addition, workers can record equipment deterioration so they know to replace or repair worn parts before they cause system failure. The ideal machine maintenance program would prevent any unnecessary and costly repairs.

Preventive maintenance (PM) strategies can be further subdivided into usage and condition based preventive maintenance.

Under usage based PM, the total usage of a part is measured and maintenance is conducted when a certain threshold level has been reached.

The usage of parts can be measured in many ways depending on the nature of the equipment. Time in the field is perhaps the most common mean to measure usage. For vehicles (e.g., rolling stock), mileage is a common measure of usage. The number of on-off cycles is a measure of usage for equipment that is mainly loaded at the end or beginning of on-off cycles. Since the usage of equipment is usually scheduled, the moment that maintenance is performed can also be scheduled. If there is a large set-up cost associated with maintenance, it can be beneficial to interchange several parts simultaneously (Block replacement and/or overhaul). Otherwise, maintenance can be performed on a single component (Component replacement and/or overhaul).

In condition based PM, also sometimes called predictive maintenance (PdM), the actual condition of a part is monitored and maintenance is planned and conducted based on the actual condition of the part in question at any given point in time.

In the context of the present invention, condition based preventive maintenance (PM), also sometimes called predictive maintenance (PdM), is to be understood as techniques designed to help determine the condition of in-service equipment in order to predict when maintenance should be performed. This approach will in most scenarios be cost-saving over routine or time-based preventive maintenance, because tasks are performed only when warranted.

Thus, compared to other maintenance schemes, condition based preventive maintenance (PM) or predictive maintenance (PdM), allows for convenient scheduling of corrective maintenance, and prevents unexpected equipment failures. The key in PM/PdM is that it gives access to "the right information in the right time". By knowing whether a certain piece of equipment needs maintenance or not, maintenance work can be better planned (spare parts, wearing parts, people, etc.) and what would have been "unplanned stops" are transformed to "planned stops", the number of which is, furthermore, minimized, which increases plant availability. Other potential advantages include increased equipment lifetime, increased plant safety, fewer accidents with negative impact on safety and environment, and optimized spare and wearing parts handling.

Thus condition based PM (PdM) differs from usage based PM because it relies on the actual condition of equipment, rather than average or expected life statistics, to predict when maintenance will be required.

Surface fatigue is a process by which the surface of a material is weakened by cyclic loading, which is one type of general material fatigue. Fatigue wear is produced when the wear particles are detached by cyclic crack growth of microcracks on the surface. These microcracks are either superficial cracks or subsurface cracks.

Fretting wear is the repeated cyclical rubbing between two surfaces. Over a period of time fretting which will remove material from one or both surfaces in contact. It occurs typically in bearings, although most bearings have their surfaces hardened to resist the problem. Another problem occurs when cracks in either surface are created, known as fretting fatigue. It is the more serious of the two phenomena because it can lead to catastrophic failure of the bearing. An associated problem occurs when the small particles removed by wear are oxidised in air. The oxides are usually harder than the underlying metal, so wear accelerates as the harder particles abrade the metal surfaces further. Fretting corrosion acts in the same way, especially when water is present. Unprotected bearings on large structures like bridges can suffer serious degradation in behaviour, especially when salt is used during the winter to deice the highways carried by the bridges. The problem of fretting corrosion was involved in the Silver Bridge tragedy and the Mianus River Bridge accident.

Erosive wear can be defined as an extremely short sliding motion and is executed within a short time interval. Erosive wear is caused by the impact of particles of solid or liquid against the surface of an object. The impacting particles gradually remove material from the surface through repeated deformations and cutting actions. It is a widely encountered mechanism in industry. Due to the nature of the conveying process, piping systems are prone to wear when abrasive particles have to be transported.

Corrosion and oxidation wear occurs both in lubricated and unlubricated contacts. The fundamental cause are chemical reactions between the worn material and the corroding medium. Wear caused by a synergistic action of tribological stresses and corrosion is also called tribocorrosion.

In the context of the present invention "wear" can be any of the types of wear described above.

As used herein a "wearing part" or a "spare part", "spare", "service part", "repair part", or "replacement part", is an interchangeable part that is kept in an inventory and used for the repair or replacement of failed units. Spare parts are an important feature of logistics engineering and supply chain management, often comprising dedicated spare parts management systems.

Capital spares are spare parts which, although acknowledged to have a long life or a small chance of failure, would cause a long shutdown of equipment because it would take a long time to get a replacement for them.

Spare parts can be broadly classified into two groups, repairables and consumables.

Economically, there is a tradeoff between the cost of ordering a replacement part and the cost of repairing a failed part. When the cost of repair becomes a significant percentage of the cost of replacement, it becomes economically favorable to simply order a replacement part. In such cases, the part is said to be "beyond economic repair" (BER), and the percentage associated with this threshold is known as the BER rate. Analysis of economic tradeoffs is formally evaluated using Level of Repair Analysis (LORA).

Repairable parts are parts that are deemed worthy of repair, usually by virtue of economic consideration of their repair cost. Rather than bear the cost of completely replacing a finished product, repairables typically are designed to enable more affordable maintenance by being more modular. This allows components to be more easily removed, repaired, and replaced, enabling cheaper replacement. Spare parts that are needed to support condemnation of repairable parts are known as replenishment spares.

Parts that are not repairable, are considered consumable parts. Consumable parts are usually scrapped, or "condemned", when they are found to have failed. Since no attempt at repair is made, for a fixed mean time between failures (MTBF), replacement rates for consumption of consumables are higher than an equivalent item treated as a repairable part. Because of this, consumables tend to be lower cost items.

A "wearing part" or a "spare part", "spare", "service part", "repair part", or "replacement part" according to the present invention can be either a repairable or a consumable.

As used herein "Optical fibers" are flexible, transparent fibers made by drawing glass (silica), polymers, e.g. transparent polymers, plastic or another suitable material to a narrow diameter. Thus, even if optical fibers are mostly made from silica, some other materials, such as fluorozirconate, fluoroaluminate, and chalcogenide glasses as well as crystalline materials like sapphire, may be used for longer-wavelength infrared or other specialized applications. Traditionally optical fibers are used as a means to transmit light between the two ends of the fiber over longer distances than what is possible with electrical cables. Also, signals travel along optical fibers with less loss than in metal wires, just like optical fibers are, unlike metal wires, normally immune to electromagnetic interference.

Being able to join optical fibers with low loss is important in fiber optic communication. This is more complex than joining electrical wire or cable but normally involves careful cleaving of the fibers, precise alignment of the fiber cores, and the coupling of these aligned cores.

As used herein a "fiber optic splitter" or "splitter", is a device capable of dividing an incoming light beam into one or several resulting beams in a predetermined fashion. The division resulting from passing an incoming beam through a "splitter" may result in a change in the wavelength-pattern and the relative direction of the resulting beams compared to the incoming beam, just as it may result in a loss of signal of the resulting beams compared to the incoming beam. A multiplicity of "splitters" may be inter-connected to form a so-called "reflector".

As used herein "condition based preventive maintenance (PM)" or "predictive maintenance (PdM)" is the care and servicing by personnel for the purpose of maintaining equipment in satisfactory operating condition by providing for systematic detection, and correction of incipient failures either before they occur or before they develop into major defects. It includes work carried out on equipment in order to avoid its breakdown or malfunction, including e.g. tests, measurements, adjustments, parts replacement, and cleaning, performed specifically to prevent faults from occurring.

Condition based preventive maintenance (PM) or predictive maintenance (PdM) differs from usage based preventive maintenance because it relies on the actual condition of equipment, rather than average or expected life statistics, to predict when maintenance will be required.

Some of the main components that are necessary for implementing PdM are data collection and preprocessing, early fault detection, fault detection, time to failure prediction, maintenance scheduling and resource optimization.

PdM evaluates the condition of equipment by performing periodic (offline) or continuous (online) equipment condition monitoring. The ultimate goal of the approach is to perform maintenance at a scheduled point in time when the maintenance activity is most cost-effective and before the equipment loses performance within a threshold. This results in a reduction in unplanned downtime costs because of failure where for instance costs can be in the hundreds of thousands per day depending on industry. In energy production in addition to loss of revenue and component costs, fines can be levied for non delivery increasing costs even further.

This is in contrast to time- and/or operation count-based maintenance, where a piece of equipment gets maintained whether it needs it or not. Time-based maintenance is labor intensive, ineffective in identifying problems that develop between scheduled inspections, and so is not cost-effective.

The "predictive" component of PdM stems from the goal of predicting the future trend of the equipment's condition. This approach uses principles of statistical process control to determine at what point in the future maintenance activities will be appropriate.

Most predictive inspections are performed while equipment is in service, thereby minimizing disruption of normal system operations. Adoption of PdM can result in substantial cost savings and higher system reliability.

One possibility is to transfer the PdM data to a computerized maintenance management system (CMMS) so that the equipment condition data is sent to the right equipment object in the CMMS system in order to trigger maintenance planning, work order execution, and reporting.

To evaluate equipment condition, PdM according to the present invention utilizes nondestructive testing technologies such as light emitting devices emitting infrared, laser or visible light and other specific online tests. These measurements can be used to measure on as well the actual equipment as on process performance, which can then be used to trigger equipment maintenance.

Thus, the analysis, when properly done, allows the user to evaluate the condition of equipment and avoid failures.

In contrast to other methods of evaluation, light-based monitoring and analysis, whether achieved via light emitting devices emitting infrared, visible or laser light, has the widest range of application (from high- to low-speed equipment), and it can be effective for spotting both mechanical and electrical failures.

The methods of the present invention can be combined with Model Based Condition Monitoring for predictive maintenance programs. This method involves analysis of the desired parameters and then compares the measured parameters to a known and learned model of the wear of the wearing part to diagnose various anomalies. This process of "model based" condition monitoring allows for the automation of data collection and analysis tasks, providing round the clock condition monitoring and warnings about faults as they develop.

In a particular preferred embodiment of this invention, it is possible to follow the wear of a wearing part in a way, which enables the gathering of information as to when it is worn to critical level and thus also enables prediction as to the expected additional lifetime of the wearing part. In this embodiment optical fibres are placed in such a way that loss of emitted light will indicate when there is sufficient time to plan a change of the wearing part, so that sudden failure of the wearing part followed by immediate production stop resulting in high economical losses and high maintenance costs can be avoided. Thus, a need for sudden changes of dynamic seals having diameters of more than 0500 mm is typically very expensive and the indication of when a change is needed, which is made possible by the present invention will dramatically reduce of the total lifetime cost of any machinery having either large diameters or being placed in remote areas or being used in processes with very high production profits. Also any unnecessary change of wearing parts and the resulting costs can be avoided since the methods and wearing parts of the present invention enables the change of wearing parts only when needed.

The methods and wearing parts of the present invention can in principle be used in all fields of technology and industry, which involves the use of wearing parts, and in which the exchange of wearing parts involves high costs, e.g. due to production loss. However, the methods and wearing parts of the present invention are of particular relevance to the pulp and paper industry, the wind turbine industry, the Off Shore industry and in the context of bridge support.

In certain preferred embodiments, the methods and wearing parts of the present invention are optimized for use as sealings and/or gaskets in the wind power industry. Wind power is one of the most developed alternative energy source, and in recent years, the wind industry has installed over 38 GW of new wind power capacity globally. Sealings for the wind industry according to the present invention includes seals for gears and transmissions, seals for accumulators, seals for brakes and actuators, seals for lock and pitch cylinders, seals for mountings and bearings. In a preferred embodiment sealings for the wind industry according to the present invention are so-called dynamic sealings. With the present invention the wear of e.g. dynamic seals placed in a wind mill can be monitored at a distance without being at the top of the wind mill, e.g. at a distance of several hundred meters.

In certain preferred embodiments, the methods and wearing parts of the present invention are optimized for use as sealings and/or gaskets in the Off Shore industry. Sealings and/or gaskets used in the Off Shore industry are typically used in transport systems, hatches, sliding systems, engine rooms and pumps. In addition certain wearing parts in the form of sleeves are used to protect measure and control equipment or pumps against influences of sea, sand and wind. In a preferred embodiment sealings for the Off Shore industry according to the present invention are so-called dynamic sealings. Thus, e.g. the wear of sealings in remote Off Shore loading systems with swivels allowing the ship to rotate 360°, or sealings of cranes (also rotating 360°, can be monitored by the methods of the present invention and the applicable wear and estimated additional lifetime of the sealing systems of the swivel can be determined. IN such an embodiment the methods and wearing parts of the present invention can be used to monitor the wear of sealings having diameters from ø400 mm and up to ø100000 mm.

In certain preferred embodiments, the methods and wearing parts of the present invention are optimized for use in the context of bridge support, in particular in the form of so-called sliding bearings. In a preferred embodiment sealings for use in the context of bridge support according to the present invention are so-called dynamic sealings. Sliding bearings can be of many different sizes one very long or several short ones. For bridge sliding support the wearing parts of the present invention can be placed in different positions to get a better estimation of the actual wear rate of the total construction. The same would apply to large machinery with liner sliding support.

In certain preferred embodiments, the methods and wearing parts of the present invention are optimized for use in the pulp and paper industry. In a preferred embodiment sealings for the pulp and paper industry according to the present invention are so-called dynamic sealings. Thus, in particularly preferred embodiments of the methods and wearing parts of the present invention the wearing parts are wearable seals, e.g. dynamic sealings, used in the equipment typical to the pulp and paper industry. In these embodiments seal life time varies from 0.5 years to 2 years (depending on the specific equipment and processing equipment). For the pulp and paper industry dynamic seals normally range from ø3000 mm up to more than ø6000 mm. However, the normal dimension range is from ø1000 mm up to ø6000 mm. CD-filter seals normally range from ø1000 up to ø2000 mm, while radial or face-seal normally have a diameter >ø500 mm.

At present it is common that pulp mills have only one shutdown period every 1, 1.5 or 2 years. This shutdown period will usually be 6-10 days long, and will include maintenance operations on all equipment. Thus, ideally all equipment should work properly between these big shutdowns, and if the whole mill has to be stopped in between the regular maintenance operation periods, e.g. because of equipment failure, the production loss costs involved are huge. Thus, a functional failure of central equipment, such as a DD washer, due to sealing failure will stop the pulp making process. In that case making a repair will usually take 16-24 hours, and in more complicated cases as much as 48-72 hours, and will lead to limited production capacity and quality losses.

Thus, present methods would involve reliance on indirect indicators of sealing profile and wear by periodic measurements of seal water flow values (manual flowmeters etc.) and measurements of pressure or propellant air values (manual flowmeters). The measurement of such values will only provide information as to whether a given sealing (or even group of sealings) is (or are) working or not, but will not provide any information as to the seal profile as such.

In contrast, the methods and wearing parts, e.g. sealings such as dynamic sealings, of the present invention, will provide specific information on the seal profile as such, and will enable arranged and planned shutdowns. Thus, usually the mills have 1-3 small (16-32 h) shutdowns between the big shutdowns, which—if the seal condition is known—can be used to change warn seals. This again would mean avoiding sudden seal failure and the accompanying costly shutdowns.

In addition, the methods and wearing parts, e.g. sealings such as dynamic sealings, of the present invention, will enable optimization of the life time of relevant sealings. Thus, seal change is in itself an expensive maintenance task. In most mills seals are replaced every year, whereas being able to monitor the wear of sealings in accordance with the methods and wearing parts of the present invention could expand the seal change period from 1 year to 1.5 years or even 2 years. Expanding the seal change period without the methods and wearing parts of the present invention, would involve the risk of seal failure and sudden production stop, since the situation of the sealing can only be obtained by dismantling the equipment to check. Dismantling in itself involves a big risk of braking the sealing.

A wearing part according to the present invention will preferably either consists primarily of, or is covered at least partially by a sliding layer consisting primarily of, a polymer material such as PolyTetra Flour Ethylen (PTFE), Polychlorotrifluoroethylene (PCTFE), Perfluoroalkoxy (PFA), Tetrafluorethylene-perfluoropropylene (FEP), ETFE, FEP, LCP, Chlorotrifluoroethylene (E-CTFE), PE, PEEK, PET, PVDF, THV and/or the like.

In addition a wearing part according to the present invention may also either consists primarily of, or be covered at least partially by a sliding layer consisting primarily of, a rubber material such as:

Nitrile—Acrylonitrile-butadiene rubber—NBR
Hydrogenated Nitrile—Hydrogenated Acrylonitrile-butadiene rubber—HNBR
Ethylene-Propylene—Ethylene propylene diene rubber—EPDM
Fluorocarbon—Fluorocarbon Rubber—FKM
Fluorocarbon—Fluorocarbon Rubber—FFKM
Chloroprene—Chloroprene rubber—CR
Silicone—Silicone rubber—VMQ
Fluorosilicone—Fluorosilicone rubber—FVMQ
Polyacrylate—Polyacrylate rubber—ACM
Ethylene Acrylic—Ethylene Acrylic rubber—AEM
Styrene-butadiene—Styrene-butadiene rubber—SBR
Natural rubber—NR Finally, a wearing part according to the present invention may also either consists primarily of, or be covered at least partially by a sliding layer consisting primarily of, an elastomer material such as Polyurethane—Polyester urethane/Polyether urethane—AU/EU.

Wearing parts, e.g. a dynamic sealing, according to the present invention typically have diameters from ø500 mm up to ø8000 mm, resulting in a total circumference of from 1500 mm up to 24000 mm, such as diameters from ø900 mm up to ø6000 mm, resulting in a total circumference of from 2700 mm up to 18000 mm, such as diameters from ø1000 mm up to ø5000 mm, resulting in a total circumference of from 3000 mm up to 15000 mm, such as diameters from ø1500 mm up to ø3000 mm, resulting in a total circumference of from 4500 mm up to 9000 mm. Similarly linear wearing parts according to the present invention will typically have a total length of from 3000 mm up to 18000 mm, such as from 4000 mm up to 15000 mm, such as from 5000 mm up to 10000 mm but also lengths of up to 50, 60, 70, 80, 90 or several hundred meters or even kilometres would be relevant to linear wearing parts according to the present invention.

Optical fibers according to the present invention are flexible, transparent fibers made from silica, polymers, e.g. transparent polymers, or other suitable materials like fluorozirconate, fluoroaluminate, chalcogenide glasses or crystalline materials like sapphire.

Optical fibers according to the present invention may be interconnected by means of splitters or reflectors.

Thus, in a first aspect, the present invention provides a method for detecting excessive wear of a wearing part, which wearing part:
a) either consists primarily of, or is covered at least partially by a sliding layer consisting primarily of, a polymer material such as PolyTetra Flour Ethylen (PTFE), Polychlorotrifluoroethylene (PCTFE), Perfluoroalkoxy (PFA), Tetrafluorethylene-perfluoropropylene (FEP), ETFE, FEP, LCP, Chlorotrifluoroethylene (E-CTFE), PE, PEEK, PET, PVDF, THV and/or the like, and
b) comprises one or more optical fibers fitted in, embedded in, indented in or fused with said polymer material, of which:
at least one first optical fiber is in its proximal end connected to a proximal light detecting device comprising a first element which emits visible light when light is emitted from a light emitting device into the proximal end of said at least one first optical fiber, and
at least one optical fiber, optionally being said first optical fiber, is in its distal end connected to a distal end light detecting device comprising a second element, which emits visible light, when light, emitted from said light emitting device into said proximal end of said at least one first optical fiber, is emitted from the distal end of said optical fiber, optionally being said first optical fiber, and which wearing part and one or more optical fibers are further characterized in that
c) light emitted from said light emitting device into said proximal end of said at least one first optical fiber, has travelled either along substantially the entire circumference of said wearing part, or has traversed substantially the entire length of said wearing part, through said optical fiber or fibers, when emitted from the distal end of said optical fiber, optionally being said first optical fiber, and
d) the distance travelled by said light along said substantially entire circumference of said wearing part, or when traversing said substantially entire length of said wearing part, between said proximal end of said at least one first optical fiber, and said distal end of said optical fiber, optionally being said first optical fiber, is at least 500 mm,
and, which method comprises at least the following steps:
turning on said light emitting device,
inspecting whether said proximal and said distal light detecting devices emit visible light, and
concluding that said wearing parts are not subject to excessive wear if both said proximal and said distal light detecting devices emit visible light Even if the detecting devices of a method according to the present invention relies on the emission of visible light, the light emitted from the light emitting device into the proximal end of an optical fiber of a method according to the present invention may be of any kind, i.e. visible, laser or infrared light.

In a second aspect, the present invention provides a wearing part, which:
a) either consists primarily of, or is covered at least partially by a sliding layer consisting primarily of, a polymer material such as PolyTetra Flour Ethylen (PTFE), Polychlorotrifluoroethylene (PCTFE), Perfluoroalkoxy (PFA), Tetrafluorethylene-perfluoropropylene (FEP), ETFE, FEP, LCP, Chlorotrifluoroethylene (E-CTFE), PE, PEEK, PET, PVDF, THV and/or the like, and
b) comprises one or more optical fibers fitted in, embedded in, indented in, or fused with said polymer material, of which:
at least one first optical fiber is in its proximal end connected to a proximal light detecting device comprising a first element which emits visible light when light is emitted from a light emitting device into the proximal end of said at least one first optical fiber, and
at least one optical fiber, optionally being said first optical fiber, is in its distal end connected to a distal end light detecting device comprising a second element, which emits visible light, when light, emitted from said light emitting device into said proximal end of said at least one first optical fiber, is emitted from the distal end of said optical fiber, optionally being said first optical fiber.
and which wearing part and one or more optical fibers are further characterized in that
c) light emitted from said light emitting device into said proximal end of said at least one first optical fiber, has travelled either along substantially the entire circumference of said wearing part, or has traversed substantially the entire length of said wearing part, through said optical fiber or fibers, when emitted from the distal end of said optical fiber, optionally being said first optical fiber, and
d) the distance travelled by said light along said substantially entire circumference of said wearing part, or when traversing said substantially entire length of said wearing part, between said proximal end of said at least one first optical fiber, and said distal end of said optical fiber, optionally being said first optical fiber, is at least 500 mm. Even if the detecting devices of a wearing part according to the present invention relies on the emission of visible light, the light emitted from the light emitting device into the proximal end of an optical fiber of a wearing part according to the present invention may be of any kind, i.e. visible, laser or infrared light.

In a particularly preferred embodiment of said first or said second aspect said light emitting device is a laser device.

In a further particularly preferred embodiment of said first or said second aspect at least one of said light detecting devices consists of a lens made from semi-transparent material.

In a yet further particularly preferred embodiment of said first aspect the presence and/or absence of any visible light emitted by at least one of said light detecting devices is detected by a photo optical sensor, and information thereabout is stored, as an integral part of a process control system (DCS).

In a still yet further particularly preferred embodiment of said first or said second aspect said optical fibers being fitted in, embedded in, indented in, or fused with said polymer material, are interconnected by means of splitters or reflectors.

In a still yet further particularly preferred embodiment of said first or said second aspect said wearing part is a sealing, such as a dynamic sealing.

In a still yet further particularly preferred embodiment of said first or said second aspect said one or more said optical fibers being fitted in, embedded in said sealing encircles at least a part of a complete circumference of said sealing.

Additional further preferred embodiments of said first aspect includes methods:
wherein said wearing part is, when in use, subjected to temperatures in the range of 700-1600 K and pressures of 1 bar or above
wherein said wearing part is, when in use, subjected to temperatures in the range from 10-270 K and pressures of 1 bar or below
wherein said wearing part is, when in use, subjected to a pH above 9, such as above 13
wherein said wearing part is, when in use, subjected to a pH below 5, such as below 2

Additional further preferred embodiments of said second aspect includes wearing parts:
wherein said optical fibers have a diameter of 1 to 150 um, i.e. between, 10 and 50 um, such as 20 um
wherein the types of said optical fibers are selected among the group of types consisting of PG, JTFLH, JTFSH, JTFIH, FV, FI, FDP, FBP, FBPI, GI SMF-28, SM, PM panda, PM bow-tie, HWCA and HWEA
wherein said optical fibers being fitted in, embedded in, indented in, or fused with said polymer material, are interconnected by means of splitters or reflectors.
wherein said optical fibers being fitted in said polymer material, are fitted by means of installation supports, made from a material suitable in the context of said polymer material and, thus, made from e.g. PTFE, rubber or any kind of suitable material, whereby a more accurate positioning of the individual fibre is ensured.

Optical fibers applicable for use in a wearing part or method according to the present invention are flexible, transparent fibers made from silica, fluorozirconate, fluoroaluminate, chalcogenide glasses or crystalline materials like sapphire, e.g. like the ones seen on e.g. www.lasercomponents.com

EXAMPLES

Example 1

An optical fiber was cooked/boiled in boiling water and bended. A fiber having a diameter of 1.5 mm was easily bended down to a radius of 50 mm.

Example 2

Figure 1:
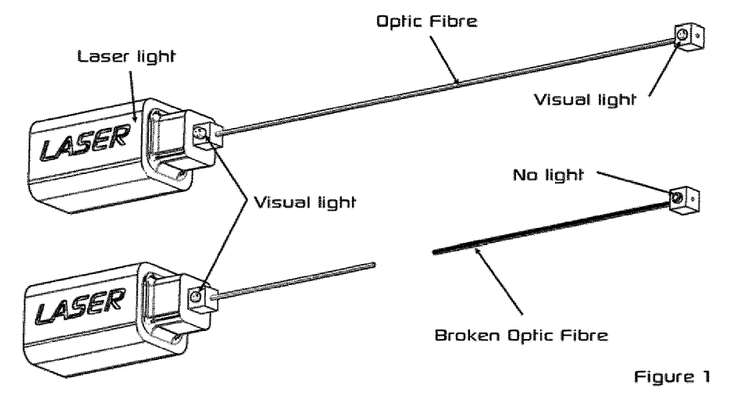
FIG. 1 shows a schematic representation of a wearing part according to the present invention and a light emitting device to be used in a method according to the present invention.
Figure 2:
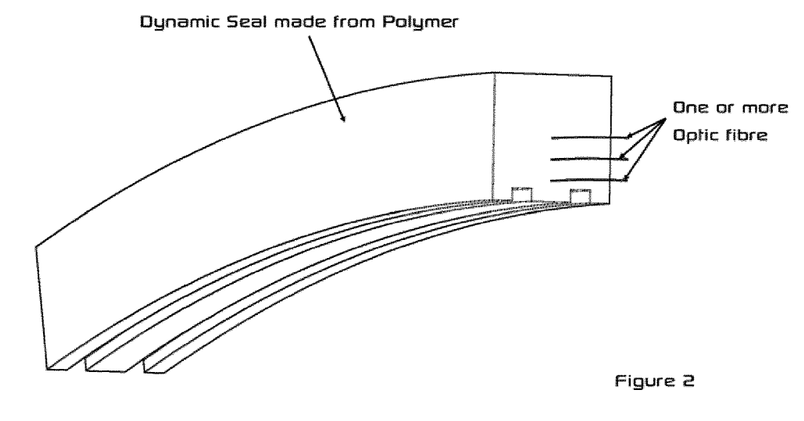
FIG. 2 shows a preferred embodiment of a wearing part according to the present invention in the form of a sealing, in this embodiment represented by a dynamic sealing, with embedded optical fibres; as shown one or more fibres can be fitted into the sealing made from a polymer material according to the present invention.

A wearing part according to the present invention and a light emitting device to be used in a method according to the present invention is interconnected as shown in FIG. 1.

Figure 3:
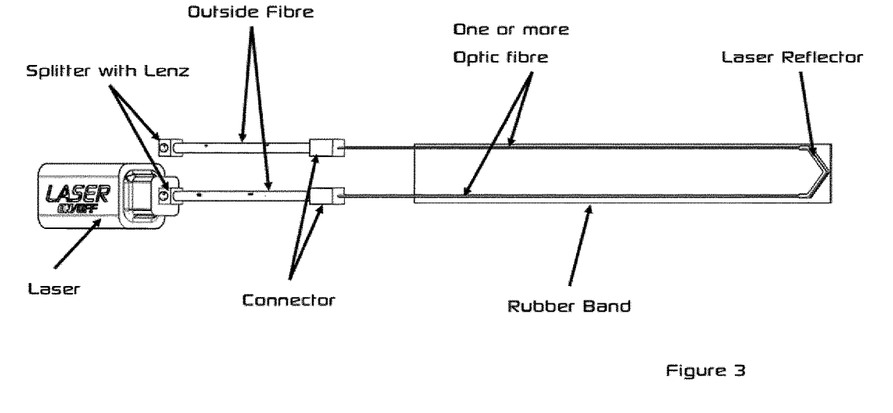
FIG. 3 describes the principle used in a method for detecting excessive wear of a wearing part according to the present invention in the form of a schematic representation of a wearing part (e.g. a dynamic sealing made from a polymer material according to the present invention and incorporating a rubber band), according to a preferred embodiment of the present invention, in which the optical fibres are fitted with splitters/lenzes and interconnected with connectors and reflectors, which may be a multiplicity of splitters.
Figure 4:
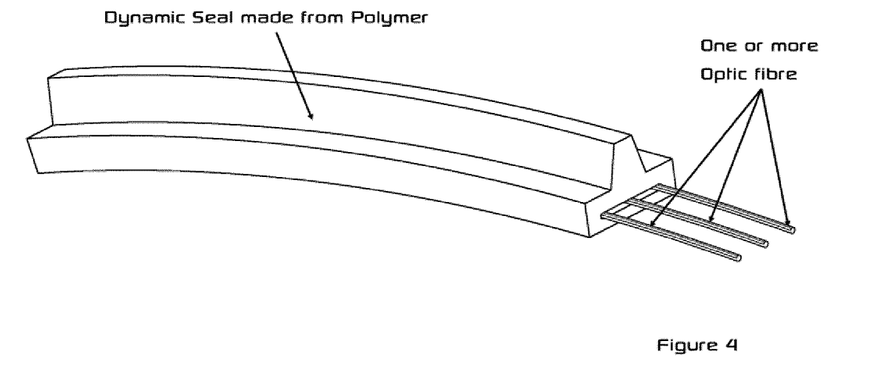
FIG. 4 shows how one or more fibres can be fitted into a dynamic sealing according to a preferred embodiment of a wearing part according to the present invention, which will enable the indication of wear at different rates at different positions in the dynamic sealing made from a polymer material according to the present invention.
Figure 5:
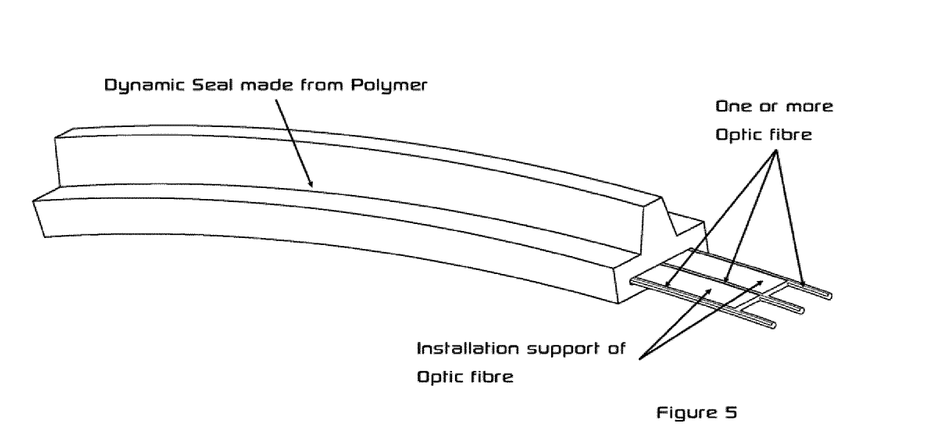
FIG. 5 shows how one or more fibres can be fitted into a dynamic sealing according to a preferred embodiment of a wearing part according to the present invention, where installation supports ensure a more accurate positioning of the individual fibre. The installation supports can be made from any material suitable in the context of the polymer material, which said dynamic sealing primarily consists of, and can, thus, be made from e.g. PTFE, rubber or any kind of suitable material.
Figure 6:
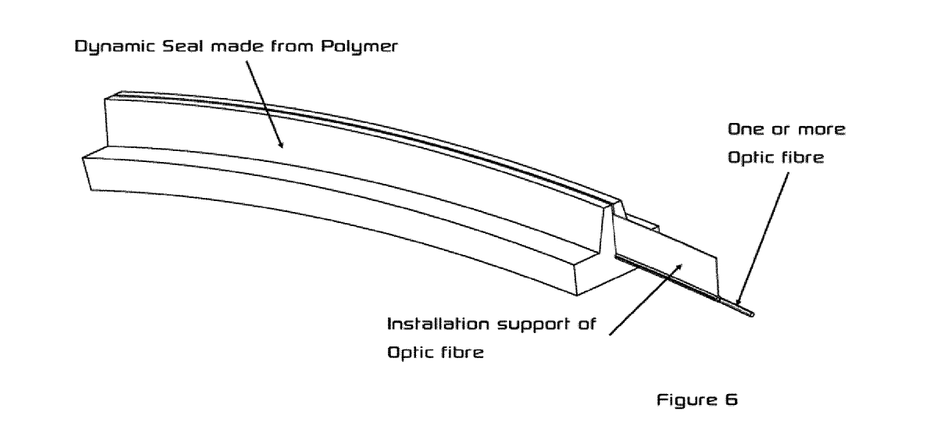
FIG. 6 shows how one or more fibres can be fitted into a dynamic sealing according to another preferred embodiment of a wearing part according to the present invention, where installation supports ensure a more accurate positioning of the individual fibre. The installation supports can be made from any material suitable in the context of the polymer material, which said dynamic sealing primarily consists of, and can, thus, be made from e.g. PTFE, rubber or any kind of suitable material.
Figure 7:
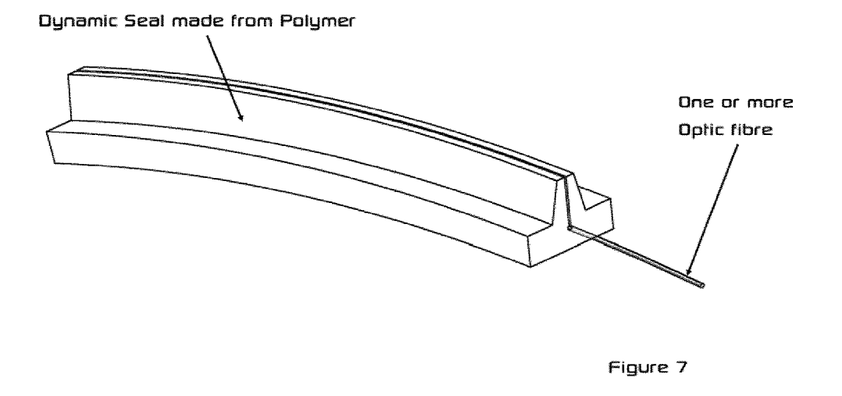
FIG. 7 shows how one or more fibres can be fitted into a dynamic sealing according to a preferred embodiment of a wearing part according to the present invention.
Figure 8:
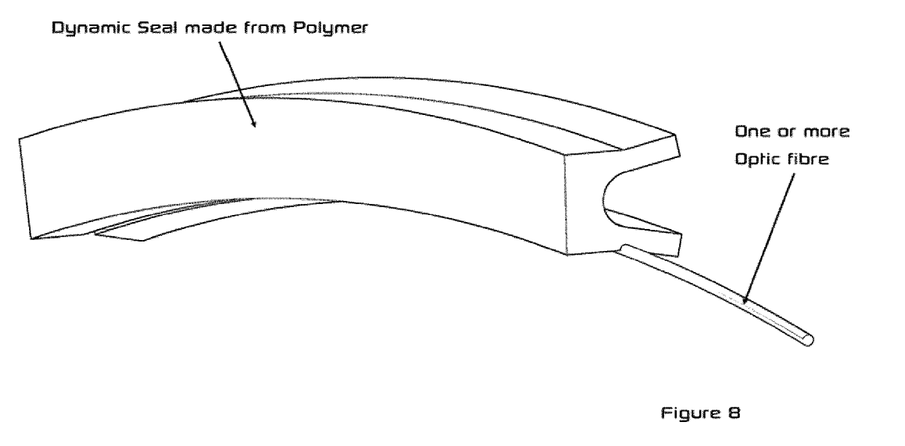
FIG. 8 shows how one or more fibres can be indented into a sealing according to a preferred embodiment of a wearing part according to the present invention made from rubber or polyurethane or any material suitable for use with a dynamic sealing made from a polymer material according to the present invention, e.g. to be used in the windpower industry.
Figure 9:
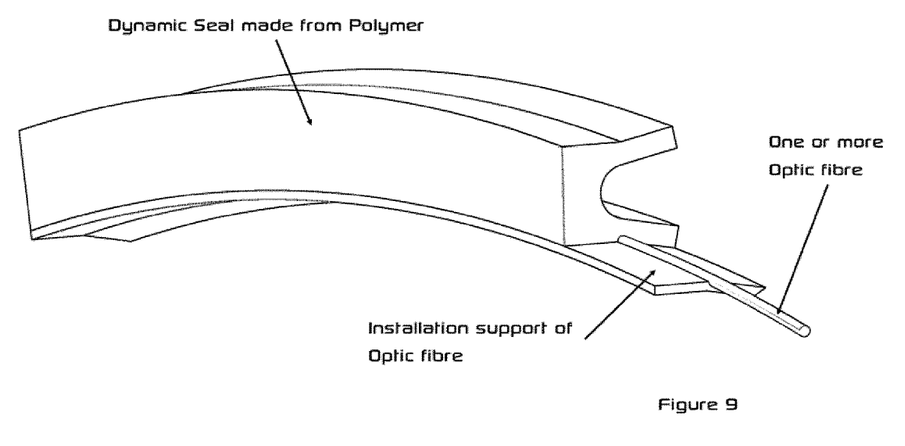
FIG. 9 shows how one or more fibres can be embedded in a dynamic sealing according to a preferred embodiment of a wearing part according to the present invention, where installation supports ensure a more accurate positioning of the individual fibre in the dynamic sealing. The installation support can be made from rubber or polyurethane or any polymer material suitable for use with a dynamic sealing made from a polymer material according to the present invention, e.g. to be used in the windpower industry.
Figure 10:
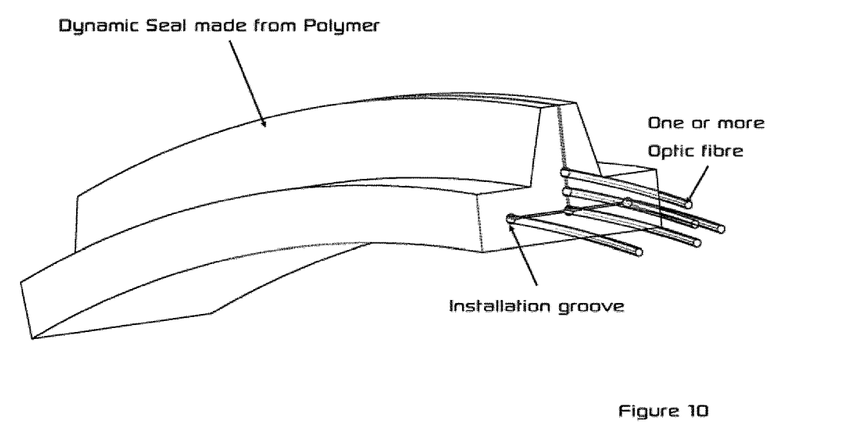
Figure 11:
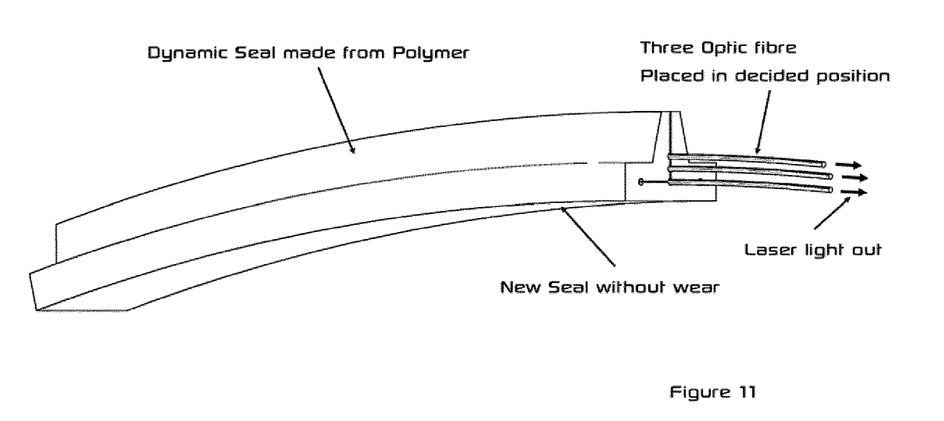
FIG. 11 shows a dynamic seal according to a preferred embodiment of a wearing part according to the present invention fitted with 3 optical fibres. The seal is static and bottom layer of the seal touches a rotating machine part. The Rotating/moving machine part will result in wear of the dynamic seal from the bottom layer. In normal operation mode the laser light will traverse all the way through all three fibres indicating that no wear is detectable.
Figure 12:
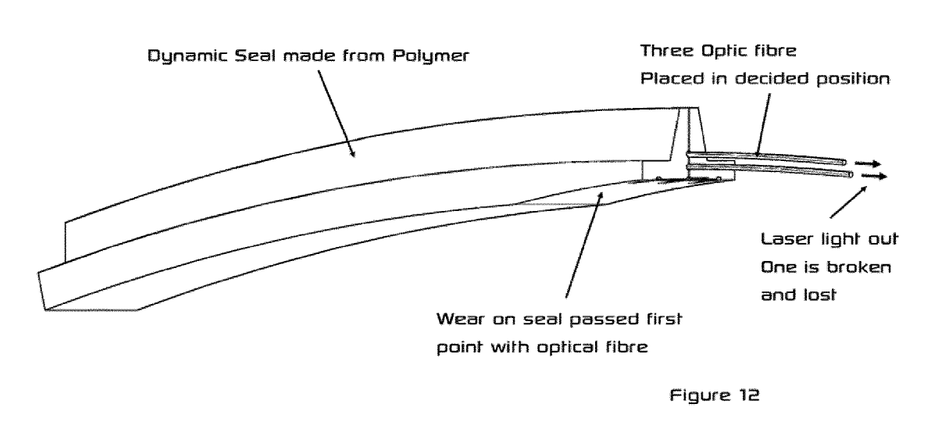
FIG. 12 shows a dynamic seal according to a preferred embodiment of a wearing part according to the present invention fitted with 3 optical fibres and a wear detection system in operation mode. The bottom layer of the seal touches a rotating machine part. In the figure there is a local wear of the seal. Because of the local wear one optical fibre is worn-out/cut locally and no light will be will be able to traverse the entire length of the fibre. The laser light will traverse all the way through the two other fibres. In this way the fact that no light is emitted from one of the fibres indicates that the first wear level has been reached and that maintenance activities need to be considered.
Figure 13:
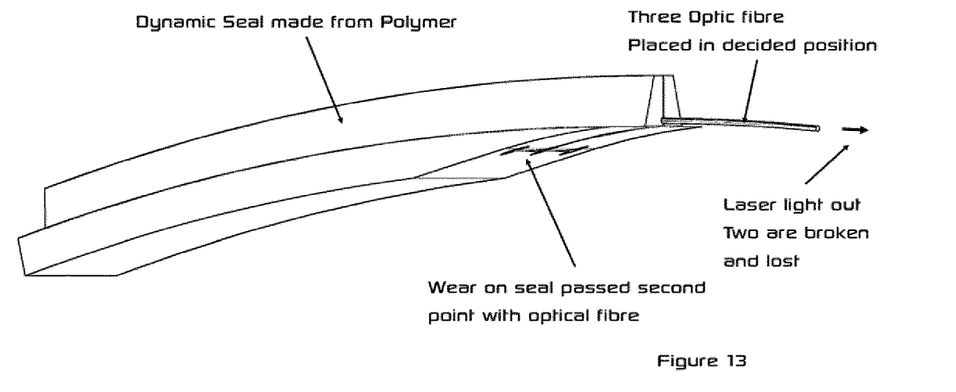
FIG. 13 shows a dynamic seal according to a preferred embodiment of a wearing part according to the present invention fitted with 3 optical fibres and a wear detection system in operation mode. The bottom layer of the seal touches a rotating machine part. In the figure there is a local wear of the seal. Because of the local wear two optical fibres are worn-out/cut locally and no laser light will be able to traverse the entire length of these two fibres. The laser light will traverse all the way through one remaining fibre. In this way the fact that no light is emitted from two of the fibres indicates that the second wear level has been reached and that maintenance activities need to be considered.
Figure 14:
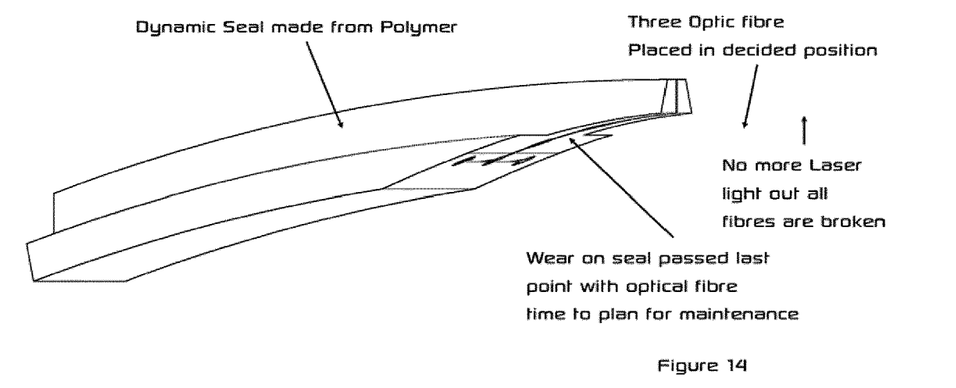
FIG. 14 shows a dynamic seal according to a preferred embodiment of a wearing part according to the present invention fitted with 3 optical fibres and a wear detection system in operation mode. The bottom layer of the seal touches a rotating machine part. In the figure there is a local wear of the seal. Because of the local wear all 3 of the optical fibres are worn-out/cut locally and no laser light will be able to traverse the entire length of any of the fibres. In this way the fact that no laser light is emitted from any of the fibres indicates that the third wear level has been reached and that maintenance activities need to be considered.
Figure 15:
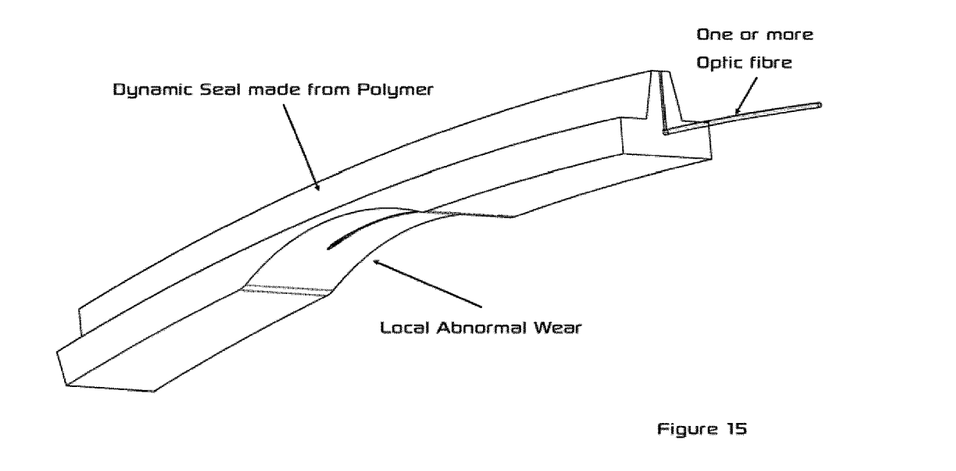
FIG. 15 shows an example of a dynamic seal according to a preferred embodiment of a wearing part according to the present invention equipped with one optical fibre. Because of a local high wear or deformation of the dynamic seal no light will be able to traverse the entire length of the fibre and the signal is lost. The fact that no light is emitted means that a certain wear level has been reached and that maintenance activities need to be considered.
Figure 16:
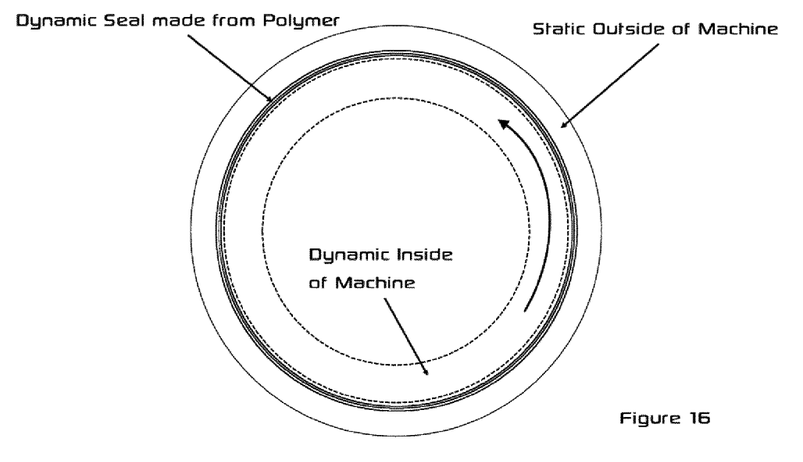
FIG. 16 shows the principle of a dynamic seal according to a preferred embodiment of a wearing part according to the present invention installed into a machine with a dynamic rotating part of the machine and a static non-rotating part of the machine. The dynamic seal is installed between the rotating part and the static part of the machine. The wear rate of such a dynamic seal can be monitored by a method according to the present invention.

A wearing part (i.e. a dynamic sealing made from a polymer material according to the present invention and incorporating a rubber band, according to a preferred embodiment of the present invention), in which the optical fibres are fitted with splitters/lenzes and interconnected with connectors and reflectors, which is a multiplicity of splitters, is used in a method for detecting excessive wear of a wearing part according to the present invention. A schematic representation is shown in FIG. 3.

Example 3

A wearing part according to the present invention in the form of a dynamic sealing is fitted with fibres in several different ways as shown in FIGS. 2 and 4-10.

What is claimed is:
1. A method for detecting excessive adhesive, abrasive, erosive or fretting wear of a wearing part,
wherein the wearing part includes:
a dynamic sealing or a gasket that is at least partially covered by a sliding layer consisting of a polymer material,
an optical fiber element formed by a single optical fiber or formed by two or more single optical fibers that are interconnected by splitters or reflectors, the optical fiber element fitted in, embedded in, indented in, or fused with the polymer material,
a proximal light detecting device providing a first element configured to emit visible light when light is emitted from a laser device into a proximal end of a first optical fiber of the optical fiber element, and
a distal light detecting device providing a second element configured to emit visible light when light that is emitted from the laser device into the proximal end of the first optical fiber is emitted from a distal end of a second optical fiber of the optical fiber element, wherein the second optical fiber is the first optical fiber or is a different optical fiber,
wherein visible light emitted from the laser device into the proximal end of the first optical fiber is configured to travel either along an entire circumference of the wearing part or along an entire length of the wearing part through the optical fiber element a travel distance of at least 1500 millimeters before being emitted from the distal end of the second optical fiber,
the method comprising the steps of:
turning on the laser device;
inspecting whether the proximal light detecting device and distal light detecting device emit visible light; and
concluding that the wearing part is not subject to excessive wear if visible light is emitted from both the proximal light detecting device and the distal light detecting device.
2. The method of claim 1, wherein at least one of said proximal and distal light detecting devices consists of a lens made from semi-transparent material.
3. The method of claim 2 wherein at least one of a presence and an absence of any visible light emitted by at least one of said proximal and distal light detecting devices is detected by a photo optical sensor, and information thereabout is stored, as an integral part of a process control system.

4. The method of claim 3 wherein said wearing part is a dynamic sealing.

5. The method of claim 4, wherein said single optical fiber or two or more single optical fibers encircles the entire circumference of said dynamic sealing.

6. The method of claim 2 wherein said wearing part is a dynamic sealing.

7. The method of claim 6, wherein said single optical fiber or two or more single optical fibers encircles the entire circumference of said dynamic sealing.

8. The method of claim 1, wherein at least one of a presence and an absence of any visible light emitted by at least one of said proximal and distal light detecting devices is detected by a photo optical sensor, and information thereabout is stored, as an integral part of a process control system.

9. The method of claim 8 wherein said wearing part is a dynamic sealing.

10. The method of claim 9, wherein said single optical fiber or two or more single optical fibers encircles the entire circumference of said dynamic sealing.

11. The method of claim 1, wherein said wearing part is a dynamic sealing.

12. The method of claim 11, wherein said single optical fiber or two or more single optical fibers encircles the entire circumference of said dynamic sealing.

13. A wearing part comprising:
a dynamic sealing or a gasket that is at least partially covered by a sliding layer consisting of a polymer material;
an optical fiber element formed by a single optical fiber or formed by two or more single optical fibers that are interconnected by splitters or reflectors, the optical fiber element fitted in, embedded in, indented in, or fused with the polymer material;
a proximal light detecting device providing a first element configured to emit visible light when light is emitted from a laser device into a proximal end of a first optical fiber of the optical fiber element; and
a distal light detecting device providing a second element configured to emit visible light when light that is emitted from the laser device into the proximal end of the first optical fiber is emitted from a distal end of a second optical fiber of the optical fiber element, wherein the second optical fiber is the first optical fiber or is a different optical fiber,
wherein visible light emitted from the laser device into the proximal end of the first optical fiber is configured to travel either along an entire circumference of the wearing part or along an entire length of the wearing part through the optical fiber element a travel distance of at least 1500 millimeters before being emitted from the distal end of the second optical fiber.

14. The wearing part of claim 13, wherein the wearing part comprises a dynamic sealing.

15. The wearing part of claim 14, wherein one of said single optical fiber or two or more single optical fibers encircles an entire circumference of said dynamic sealing.

16. The wearing part of claim 15, wherein at least one of said proximal and distal light detecting devices consists of a lens made from semi-transparent material.

17. The wearing part of claim 14, wherein at least one of said proximal and distal light detecting devices consists of a lens made from semi-transparent material.

18. The wearing part of claim 14, wherein one of said single optical fiber or two or more single optical fibers encircles an entire circumference of said dynamic sealing.

19. The wearing part of claim 14, wherein at least one of said proximal and distal light detecting devices consists of a lens made from semi-transparent material.

20. The wearing part of claim 13, wherein at least one of said proximal and distal light detecting devices consists of a lens made from semi-transparent material.

21. The wearing part of claim 13, wherein the wearing part is a dynamic sealing.

22. The wearing part of claim 13, wherein at least one of said proximal and distal light detecting devices consists of a lens made from semi-transparent material.

* * * * *